United States Patent [19]
Bernin

[11] 3,877,314
[45] Apr. 15, 1975

[54] ACCELEROMETER

[75] Inventor: Victor M. Bernin, Mount Prospect, Ill.

[73] Assignee: Illinois Tool Works Inc., Chicago, Ill.

[22] Filed: Mar. 26, 1973

[21] Appl. No.: 345,248

[52] U.S. Cl. ............................................. 73/517 B
[51] Int. Cl. .......................................... G01p 15/08
[58] Field of Search .......... 73/517 B, 517 R, 516 R, 73/492; 336/110, 20; 324/34 D

[56] References Cited
UNITED STATES PATENTS

| | | | |
|---|---|---|---|
| 2,947,176 | 8/1960 | Perry | 73/517; B |
| 2,948,842 | 8/1960 | Ditto | 336/110 X |
| 2,978,631 | 4/1961 | Wittke | 73/517 R X |
| 2,986,615 | 5/1961 | Hardway | 73/514 X |
| 3,122,927 | 3/1964 | Chass | 73/517 B |
| 3,140,606 | 7/1964 | Kramer et al. | 73/205 R |
| 3,295,355 | 1/1967 | Fisher et al. | 73/1 D |
| 3,678,763 | 8/1971 | Brooks et al. | 73/514 |

*Primary Examiner*—James J. Gill
*Attorney, Agent, or Firm*—Olson, Trexler, Wolters, Bushnell & Fosse

[57] ABSTRACT

The embodiment of the invention disclosed herein is directed to an accelerometer which has a movable magnetic member positioned in magnetic relationship with a closed loop magnetic core member to be magnetically saturated and unsaturated as a result of movement of the magnet. The movable magnet is magnetically held to a ferrous metal plate or element with a force proportional to the magnetic field strength. The degree of acceleration or deceleration required to dislodge the movable magnetic member will be indicated when the magnetic state of the closed loop magnetic core member changes as the magnet moves relative thereto.

9 Claims, 9 Drawing Figures

3,877,314
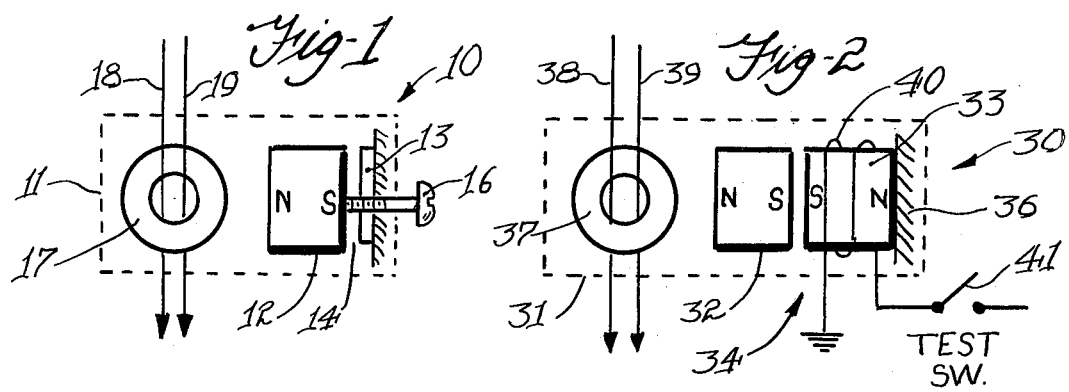
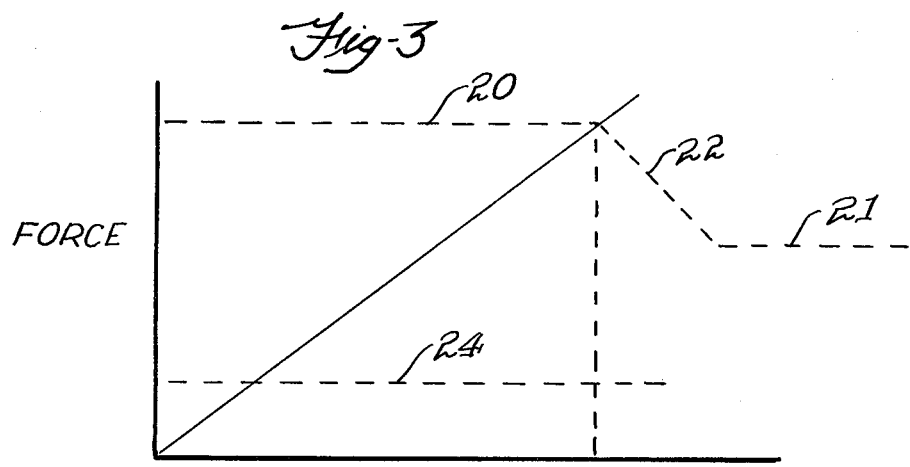
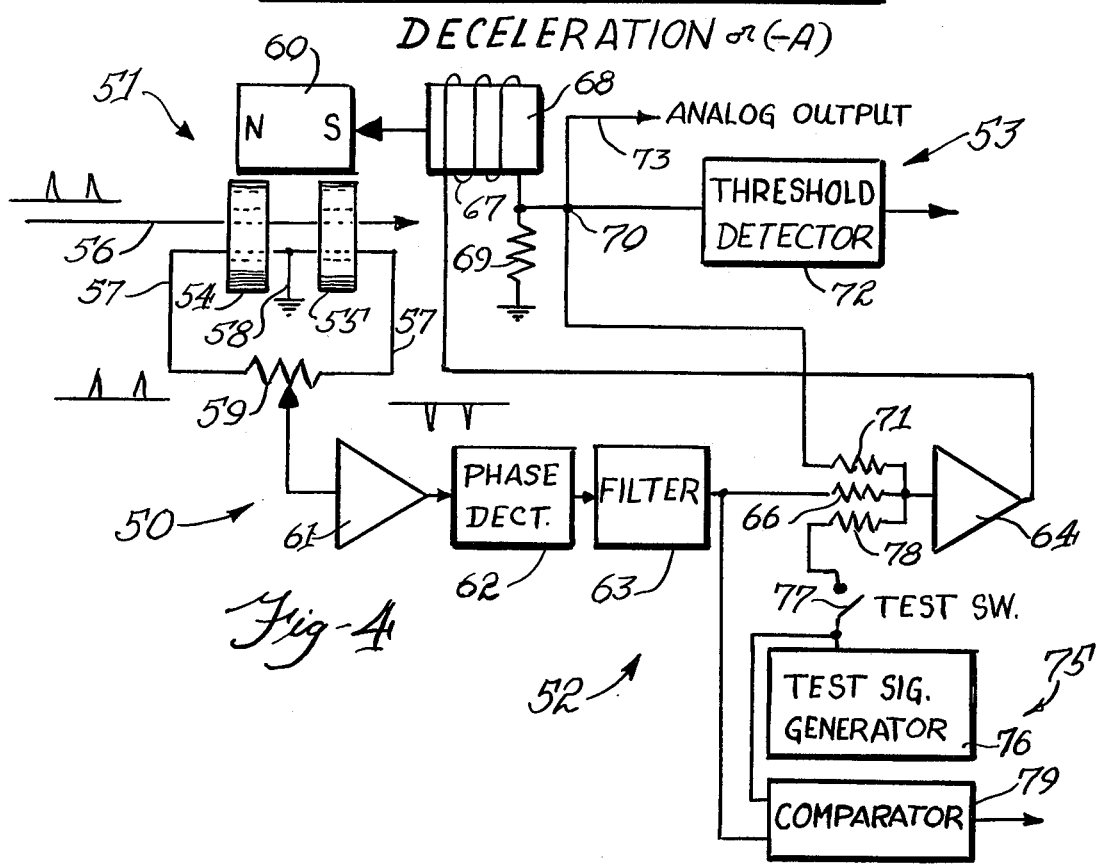

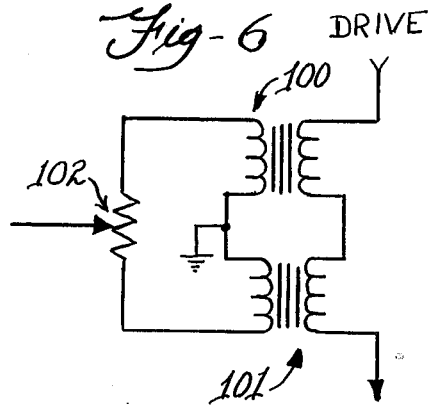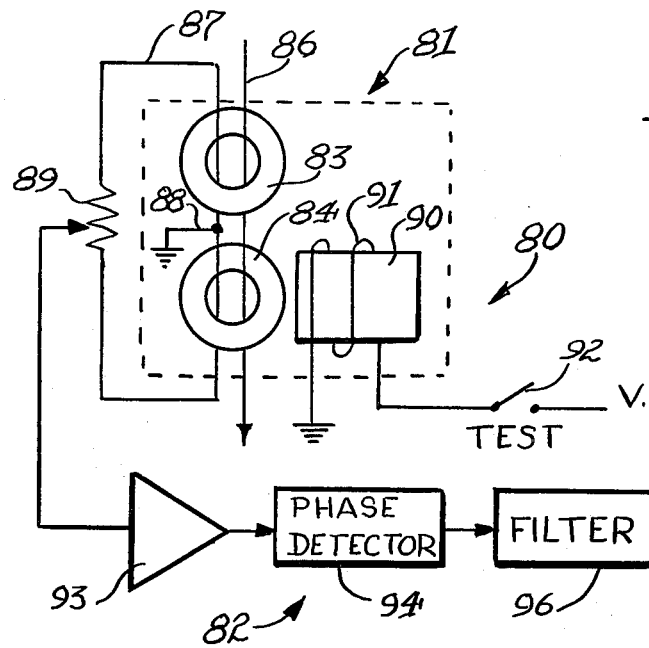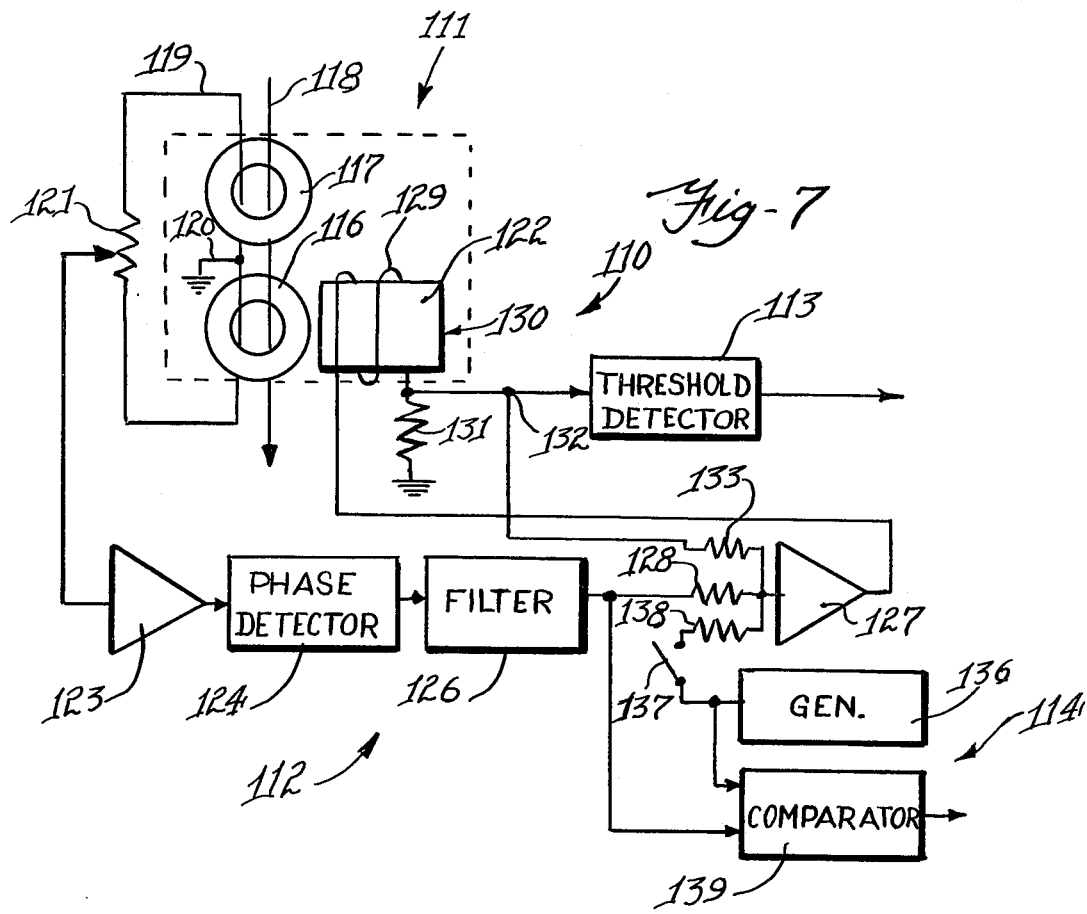

ACCELEROMETER

BACKGROUND OF THE INVENTION

This invention relates generally to an accelerometer, and more particularly to a ferrite core accelerometer.

Heretofore, accelerometers of various kinds have been developed including those having a pivotally mounted ferrous mass which is used to hold a magnetically operated switch in an open position. Upon a sufficient force caused by deceleration the metal mass will leave the magnet and close the switch.

A particular use of such accelerometers is in automobiles wherein inflatable air bags are utilized to protect the passengers in the car when a crash situation exists. This rapid deceleration as a result of headon collisions will cause the mass to part from its magnetic member and close the switch which, in turn, will cause inflation of the air bag.

These types of accelerometers are not generally suited for the purpose intended because they are not sufficiently reliable and do not lend themselves to diagnostic systems which allow for checking of components while in the circuit.

SUMMARY OF THE INVENTION

Accordingly, it is an object of this invention to provide an improved accelerometer device which is inexpensive and simple to manufacture while maintaining a high degree of reliability and efficiency in use as well as being compatible with diagnostic techniques.

Another object of this invention is to provide an accelerometer wherein a closed loop magnetic core structure is utilized in connection with a movable magnet to effect switching as a result of sensing a predetermined acceleration.

Many other objects, features, and advantages of this invention will be more fully realized and understood from the following detailed description when taken in conjunction with the accompanying drawings wherein like reference numerals throughout the various views of the drawings are intended to designate similar elements or components. Also, it will be understood that throughout the specification and claims the term acceleration is intended to include deceleration or negative acceleration as well.

BRIEF DESCRIPTION OF THE DRAWINGS

FIG. 1 is a diagrammatic representation of an accelerometer constructed in accordance with the principles of this invention;

FIG. 2 is an alternate form of accelerometer constructed in accordance with the principles of this invention;

FIG. 3 is a graph illustrating the operating characteristics of the accelerometer of FIGS. 1 and 2;

FIG. 4 illustrates the circuitry of a closed loop servo-amplifier system connected to the output of an accelerometer and is arranged in accordance with the principles of this invention;

FIG. 5 is an open loop amplifier circuit for connection to an accelerometer and is arranged in accordance with the principles of this invention;

FIG. 7 is an alternate form of the accelerometer of this invention utilizing the closed loop servo-amplifier system of FIG. 4.

DETAILED DESCRIPTION OF THE ILLUSTRATED EMBODIMENT

Figure 8:
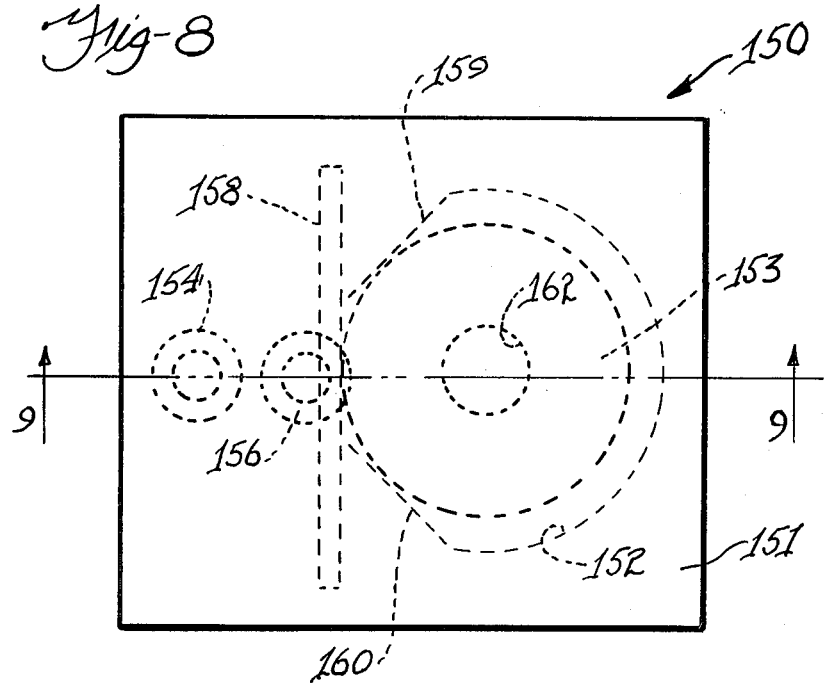
FIGS. 8 and 9 illustrate a modified form of accelerometer constructed in accordance with the principles of this invention.

Referring now to FIG. 1 there is seen an accelerometer constructed in accordance with the principles of this invention and designated generally by reference numeral 10. The accelerometer 10 includes a suitable housing, indicated diagrammatically by the dotted line 11 about the components of the figure so that the structure can be fixedly secured as a unit into a moving vehicle, or the like. The accelerometer 10 includes a movable magnet member 12 having a predetermined magnetic field strength. The magnet 12 is magnetically secured or held in place by means of a closely spaced ferrous metal member 13. The magnetic force with which the magnet 12 is attracted to the ferrous metal member 13 is proportional to the predetermined magnetic field strength of the magnet 12 and inversely proportional to the distance of the air gap 14 provided between the magnet and the ferrous metal member 13. To facilitate adjustment of the magnetic force of attraction between the magnet 12 and the ferrous metal member 13 the gap 14 is varied by means of a screw 16. Other means to vary the attractive magnetic force may be used.

Positioned in operative relation with respect to the movable magnet 12 is a closed loop magnetic core member 17 capable of being magnetically saturated and unsaturated in response to the presence and absence, respectively, of a magnetic field. A drive line 18 passes through the core member 17 to receive signal information, for example, in the form of pulse signals or alternating current signal from a suitable generator source (not shown). Immediately adjacent the drive line 18 is a sense line 19 also passing through the closed loop magnetic core member 17. The signal information on drive line 18 is transformer coupled to the sense line 19 during those instances when the closed loop magnetic core member is magnetically unsaturated. While the closed loop magnetic core member is here illustrated as toroidal in configuration it will be understood that other configurations of closed loop magnetic core members can be incorporated without departing from the spirit and scope of the novel concepts of this invention. For example, the closed loop magnetic core member 17 may be rectangular or oval if desired.

In operation, the accelerometer 10 is subjected to an acceleration or deceleration force to cause the movable magnetic member 12 to become dislodged from its magnetically secured position adjacent the ferrous metal member 13. As this happens the magnet 12 moves into close proximity to the closed loop magnetic core member 17 magnetically to saturate the same. This will instantaneously cut off transformer coupling of signal information between the drive and sence lines, which condition can be sensed by suitable circuit monitoring means to effect any type of operation as a result of the predetermined acceleration or deceleration force being reached or exceeded.

In mathematical terms, this means that the acceleration force ($F_a$) is equal to or greater than the magnetic force ($F_M$). A further mathematical analysis indicates that the force ($F_a$ can be simplified merely as mass times acceleration ($m,a$. The magnetic force ($F_M$) on the other hand, is given by the formula ($KB^2A$) where $K$ is a constant $0.57 \times 10^{-6}$, B is the magnetic flux density at point of contact between the magnet and the ferrous metal member, and A is the area of contact. With this information the precise amount of acceleration or deceleration force required to dislodge the magnet can be calculated for any given accelerometer.

For a better understanding of the relative forces that exist between the movable magnet and the ferrous metal member reference is now made to FIG. 3. Here the graph illustrates a relative force value by the broken line 20. Upon sensing a predetermined acceleration or deceleration force the magnet will move away from the ferrous metal member and the force therebetween is reduced as indicated by the broken line 21. The rate at which the movable magnet 12 moves toward the closed loop magnetic core member 17 is determined by the slope of the broken line 22 which will be in the order of milliseconds or less. The force required to return the magent 12 to its initial position adjacent the ferrous metal member is illustrated by the broken line 24. This force is relatively small as the closed loop magnetic core member 17, while being substantially completely magnetically saturated, has much less attractive force to the magnet than does the ferrous metal member 13.

Referring now to FIG. 2 an alternate form of this invention is illustrated and designated generally by reference numeral 30. Here a housing 31 is indicated by the broken line circumscribed about the active components of the accelerometer. A movable magnet member 32 is positioned within the housing and adjacent a ferrous metal core member 33 which forms part of an electro-magnet structure 34. The electro-magnet structure 34 is secured or anchored, as indicated by reference numeral 36 to any suitable means. The magnetic force of attraction between the magnet 32 and the ferrous metal member 33 is substantially the same as that indicated above with regard to FIG. 1.

A closed loop magnetic core member 37 is positioned in working operation with regard to the magnet 32 and can be magnetically saturated as a result of movement of the magnet into close proximity therewith. A drive line 38 passes through the core member 37 and delivers thereto signal information. A sense line also passes through the core member 37 and receives the signal information as a result of transformer coupling between the drive and sense lines.

The operation of the accelerometer 30 is substantially the same as that indicated in FIG. 1 with the added feature that the current winding 40 is wrapped about the ferrous metal core member 33 and forms the energizing coil for the electromagnet 34. One end of the current winding 40 is connected to ground potential and the other end thereof is connected to a source of energizing current, for example, a battery, or the like, through a test switch 41. When the electromagnet 34 is electrically energized the pole closest the movable magnet 32 has the same magnetic polarity. For example, as indicated in FIG. 2 the south poles of the permanent magnet and the electro-magnet are in close proximity to one another. Therefore, the magnetic force of repulsion will take effect substantially instantaneously upon closure of the test switch 41 to cause the permanent magnet 32 rapidly to depart from its initial position to be in close proximity to the closed loop magnetic core member 37. The amount of current flow through the electro-magnet 34 determines the rate of repulsion, this being selected to be substantially identical to the precalculated rate of deceleration required to dislodge the permanent magnet. Therefore, a selective testing of the accelerometer can be accomplished without actually causing a large deceleration force, as commonly encountered during crashes or the like.

Referring not to FIG. 4 there is seen an alternate form of accelerometer constructed in accordance with the principles of this invention and designated generally by reference numeral 50. In this instance FIG. 4 illustrates a magnetic force-balance accelerometer. The accelerometer 50 has a force-responsive means 51 operatively connected to a closed loop servo-amplifier circuit 52 which, in turn, produces output signal information at an output circuit 53.

In the illustrated embodiment the force-responsive means 51 include a pair of spaced apart closed loop magnetic core members 54 and 55 through which passes a common drive line 56 and a common sense line 57. In this instance the center portion of the sense line 57, i.e., inwardly of the pair of magnetic core members 54 and 55, is connected to a ground point 58 so that signal information developed across these sense lines can be added algebraically. A potentiometer 59 has its outer ends connected to the sense line 57 to form a balance sensing circuit. Positioned adjacent the closed loop magnetic core members 54 and 55 is a movable permanent magnet 60 so situated that each of the cores is substantially equally magnetically saturated during a normal position of the magnet. Acceleration or deceleration of the movable magnetic core causes displacement thereof so that the magnetic saturation of the closed loop magnetic core members are varied, one core member becoming more saturated and the other core member becoming less saturated.

The details of the closed loop servo-circuit 52 include an operational amplifier 61 having an input thereof connected to the movable contact of the potentiometer 59. A balance condition can therefore be adjusted and set directly into the circuit to compensate for inherent differences of physical characteristics between the closed loop magnetic core members 54 and 55 and their associated windings of sense wires. The output of the operational amplifier 61 is connected to a phase detector which, in turn, is connected to a filter circuit capable of detecting a leading or lagging phase characteristic of the signal information passing therethrough. The output of the filter circuit 63 is connected to a second operational amplifier 64 through a resistor 66. Operational amplifier 64 is connected to a winding 67 of an electro-magnetic device 68 electrically to energize the winding with a current proportional to the amount of acceleration or deceleration sensed by the force-responsive means 51. To achieve the actual current sensing of the energization of the electro-magnet 68 a resistor 69 is connected in series with the winding 67 and provides a sensing circuit point 70 at which is obtained an analog signal corresponding to the value of acceleration or deceleration experienced. The circuit point 70 has the input of a threshold detector connected thereto so that a threshold signal level can be provided when sensing acceleration of a predetermined minimum value. However, a direct analog reading can be obtained from an analog output line 73 and applied to suitable readout means such as a strip chart recorder, or the like.

In operation, the accelerometer 50 has the two ferrite cores 54 and 55 partially saturated in substantially equal amounts with respect to one another. The two sense wire signals are summed together in polarity opposition so that under balanced conditions the combined output signal at the movable contact of potentiometers 59 is substantially zero. Under conditions of acceleration or deceleration the magnet 60 will be displaced from its initial position thus causing an unbalanced signal at the potentiometer 59 as a result of increasing the magnetic saturation in one core and decreasing the magnetic saturation in the other core. The summed signal therefore constitutes a bi-polar error signal.

This signal information is coupled to the closed loop servo-circuit 52 which generates a proportional current at the output of the operational amplifier 64 and energizes the electro-magnet 68. The energization of the electro-magnet produces a proportional magnetic force which is applied to the permanent magnet 60 but in an opposite direction of the acceleration or deceleration force to cause a continuous balancing action between the saturated conditions of the closed loop magnetic core members. Therefore, the permanent magnet 60 is repositioned to maintain the core members 54 and 55 in a bridged balanced condition. The current in the electro-magnet is directly proportional to the acceleration or deceleration force. This current is sampled across the resistor 69 and applied to the threshold circuit in such a manner that a trigger signal is generated at a predetermined acceleration point.

In accordance with a novel aspect of this configuration of the accelerometer a test circuit 75 is connected to the closed loop servo-circuit 52 to provide means for testing the system without the need of actual acceleration or deceleration being experienced. The test circuit 75 includes a test signal generator 76 having the output thereof connected through a test switch 77, which is manually operated to effect a test condition, and which is connected to the input of the operational amplifier 64 through a resistor 78. The signal from the test signal generator 76 is coupled back to one input of a comparator 79 which also has a second input thereof connected to the output of the filter circuit 63. The comparator 79 therefore compares a known signal from the test signal generator with the output signal from the force-responsive means 51, as developed through the first stages of the closed loop servo-circuit 52, to give an indication that the circuit is operating properly. The output of the comparator circuit can be connected to any suitable readout device, similar to that connected either to the threshold detector circuit 72 or to the analog output line 73.

Referring now to FIGS. 5 and 6 still another alternate embodiment of the present invention is illustrated. Here the accelerometer circuit arrangement is designated generally by reference numeral 80 and includes a force-responsive means 81 the output of which is coupled to an open loop servo-circuit arrangement 82.

The force responsive means 81 includes a pair of spaced apart closed loop magnetic core members 83 and 84. This arrangement is a pressure type accelerometer in that pressure applied to the closed loop magnetic core member 84 will change its magnetic permeability, thus changing the transformer coupling effected therein between the drive and sense lines 86 and 87. The of the point of the sense line 87 between the closed loop magnetic core members 83 and 84 is connected to ground potential as indicated by reference numeral 88 while the extended portions of the sense line are connected to the ends of a resistance element of a potentiometer 89.

With the same identical magnetic field, in this instance only the earth magnetic field, and the same amount of external pressure applied to the closed loop magnetic core members, substantially the same amount of transformer coupling will exist between the drive and sense lines. To compensate for minor variations in physical structure the wiper or movable contact of the potentiometer 89 is adjusted to provide a zero beat output thereat. Upon a rapid acceleration or deceleration of a predetermined amount a movable mass 90 applies pressure to the closed loop magnetic core 84 to reduce its magnetic permeability sufficient to substantially decrease the amount of transformer coupling between the drive and sense lines of this particular core. This then causes an unbalanced condition between the signal as applied to the potentiometer 89 and thus provides an output signal in response to this pressure.

In the illustrated embodiment of FIG. 5 the movable mass 90 is an electro-magnetic device having a winding 91 wrapped thereabout and connected to a test switch 92 which, in turn, has the other end thereof connected to a suitable source of voltage. When the test switch is closed current is applied to the electro-magnet to cause the mass 90 to move toward, and apply pressure to, the closed loop magnetic core member 84.

The output of the potentiometer 89 is applied to an input terminal of an operational amplifier 93 which, in turn, has the output thereof connected to a phase detector circuit 94. The output of the phase detector is applied to a filter circuit which can filter out extraneous signals other than those which are transformer coupled into the sense line 87. This signal can be applied to any suitable readout or indicator device, or can be applied to a suitable trigger circuit to initiate energization of means such as inflatable air bag devices, or the like.

FIG. 6 illustrates the equivalent circuit of the closed loop magnetic core members utilized in the configurations of FIGS. 4, 5, and 7. Here the closed loop magnetic core members are indicated generally by reference numerals 100 and 101 having associated primary and secondary windings. The primary windings are designated by the drive line to which a common drive signal is delivered. The secondary windings are the sense lines and have the inner most end terminals thereof connected together and to ground potential. The outermost terminals of the secondary windings, sense line, are connected to the resistance element of a potentiometer 102 which is used to adjust a balanced condition at the output of the movable contact thereof when the circuit is in a normal condition. This general configuration prevails substantially unchanged throughout FIGS. 4, 5, and 7.

Referring now to FIG. 7 there is seen still another alternate embodiment of the accelerometer of the present invention. In this instance and accelerometer circuit is designated generally by reference numeral 110 and includes a force responsive circuit means 111 having the output thereof connected to a closed loop servo-circuit 112. The output of the servo-circuit 112 is developed through a threshold detector circuit 113 to be applied to any suitable readout or indicator means.

It will be understood that an analog circuit point can be incorporated similar to that shown in FIG. 4. A test circuit arrangement 114 is also provided similar to that of FIG. 4.

In the illustrated embodiment the force-responsive means 111 includes a pair of closed loop magnetic core members 116 and 117 which have a common drive line 118 passing therethrough. A common sense line 119 also passes through the core members and has a center ground point 120. The ends of the sense line 119 are connected to a potentiometer 121 which has the movable contact thereof arranged to deliver the output signal to the closed loop servo-circuit 112. A movable mass 122 is positioned adjacent the closed loop magnetic core member 116 and is used to apply pressure thereto in response to sensing acceleration or deceleration of a predetermined value. The pressure so applied to the closed loop magnetic core member will change its magnetic properties to vary the amount of transformer coupling between the drive and sense lines passing therethrough. This will provide an off balance condition within the potentiometer 121 to produce an output signal as mentioned above.

The closed loop servo-circuit 112 includes an operational amplifier 123 having an input thereof connected to the movable contact of the potentiometer 121. The output of the operational amplifier 123 is connected through a phase detector 124 to a filter circuit 126 which, in turn, is connected to a second operational amplifier 127 through a resistor 128. The output of the operational amplifier 127 is a direct current output having a value proportional to the signal information applied to the input of operational amplifier 123. The output of operational amplifier 127 is connected to a winding 129 of an electro-magnet device 130, the iron core member of which forms the movable mass 122. In this instance the electro-magnet and movalbe core thereof are used to apply pressure to the closed loop magnetic core member 116 to operate the circuit arrangement substantially in the same manner as that disclosed with regard to FIG. 5.

In accordance with an aspect of this invention the current through the winding 129 is developed across a current sensing resistor 131 which is connected to an analog output circuit point 132. The circuit point 132 is then connected to the threshold detector circuit 113. Also connected to circuit point 132 is a feedback resistor 133.

The test circuit 114 includes a test signal generator 136 having the output thereof selectively coupled to the input of operational amplifier 127 through a test switch 137 and a series connected resistor 138. The output of the test signal generator 136 is also coupled to an input of a comparator circuit 139, which has a second input thereof connected to the output of filter circuit 126 for receiving the output of the closed loop servo-circuit. The comparator is used to give an indication of the relative operability of the circuit without actually having to have actual acceleration or deceleration experienced.

Figure 9:
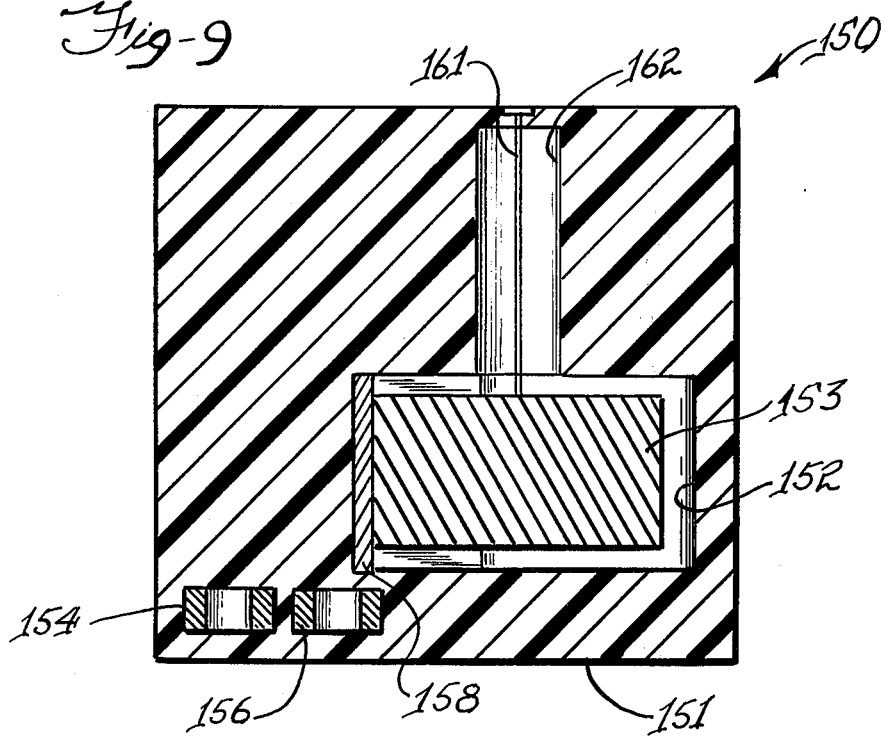

Referring now to FIGS. 8 and 9 there is seen an alternate form of accelerometer constructed in accordance with the principles of this invention and designated generally by reference numeral 150. FIG. 8 is a top view of the accelerometer while FIG. 9 is a sectional view taken along line 9—9 of FIG. 8. The accelerometer 150 includes a housing 151 having a cavity 152 formed therein to receive a substantially cylindrical configurated magnetic mass 153 preferably of a permanent magnet material. A pair of closed loop magnetic core members 154 and 156 are imbedded in the housing 151, which housing preferably of plastic or other non-magnetic material, and positioined relative to the cavity 152 so as to be in the magnetic field of the permanent magnet 153. The electrical configuration of the closed loop magnetic core members 154 and 155 may be that of any one of the embodiments as illustrated in FIGS. 4, 5, and 7.

A ferrous magnetic element 158 is mounted in the housing and arranged to form an end wall section of the cavity 152. The cavity 152 includes diverging outwardly wall sections 159 and 160, as best seen in FIG. 8, so that the cylindrical configuration of the magnet makes point contact with no more than three areas within the cavity. The magnetic mass 153 is suspended from a flexible support wire 161 which passes through a channel 162 within the housing.

In operation, the accelerometer 150 is subjected to acceleration or deceleration forces equal to or greater than the magnetic attracting force of the magnet 153 to the ferrous metal member 158. As the magnet 153 is suspended by a pendulum-like support wire it will move freely, without frictional restrictions, away from the metal member 158. Therefore, this construction has long-term reliability of operation at a predetermined acceleration force since sticking of the movable magnet 153 to a support surface upon which it rests is substantially eliminated.

While several different embodiments of the present invention have been clearly illustrated it will be understood that still further modifications and variations may be effected without departing from the spirit and scope of the novel concepts disclosed and claimed herein.

The invention is claimed as follows:

1. An accelerometer comprising in combination; a movable magnetic member having a predetermined magnetic field strength, a ferrous metal member magnetically to receive and hold said movable magnetic member with a force proportional to said predetermined magnetic field strength, at least one closed loop magnetic core structure capable of being magnetically saturated in one state and magnetically unsaturated in another state as a result of the presence and absence, respectively, of a magnetic field from said movable magnetic member, said closed loop magnetic core member being positioned relative to said movable magnetic member to be in one of its magnetic states, a drive line passing through said closed loop magnetic core member, said drive line arranged to receive signal information therealong, a sense line passing through said closed loop magnetic core member, said sense line arranged for connection in circuit with signal receiving means, said sense line receiving signal information from said drive line as a result of transformer coupling therebetween when said closed loop magnetic core member is in an unsaturated state, whereby acceleration forces applied to said movable magnetic member equal or are greater than the force produced by said predetermined magnetic field strength will cause said movable magnetic member to separate from said ferrous metal member and move relative to said closed loop magnetic core member to change the magnetic state thereof.

2. The accelerometer according to claim 1, wherein means are provided to adjust the magnetic force of attraction between said movable magnetic member and said ferrous metal member.

3. The accelerometer according to claim 1, wherein said movable magnetic member is a permanent magnet.

4. The accelerometer according to claim 3, further including means for testing the force of attraction of said movable magnetic member to said ferrous metal member to insure proper operation at a given acceleration.

5. The accelerometer according to claim 4, wherein said test means is an electro-magnet of opposite magnetic polarity to cause repulsion of said movable magnetic member at a rate equal to the force intended to be detected as a result of acceleration.

6. An accelerometer comprising at least one saturable magnetic core, a drive line coupled to said core for supplying electrical signals, a sense line coupled to said core for receiving said electrical signals from said drive line when said core is not saturated, a permanent magnet movable with respect to said core in response to an acceleration force which acts upon said permanent magnet so as to control the saturation of said core in response to the acceleration of said permanent magnet and magnetic positioning means for positioning said permanent magnet at a nominal position with respect to said magnetic core when said acceleration force is substantially zero, wherein said magnetic positioning means is a magnetizable member and said accelerometer comprises magnetizing means coupled to said magnetizable member so as to magnetize said member in a manner that controls the position of said permanent magnet with respect to said magnetic core so that the operability of said accelerometer may be verified.

7. An accelerometer comprising at least one saturable magnetic core, a drive line coupled to said core for supplying electrical signals, a sense line coupled to said core for receiving said electrical signals from said drive line when said core is not saturated, a permanent magnet movable with respect to said core in response to an acceleration force which acts upon said permanent magnet so as to control the saturation of said core in response to the acceleration of said permanent magnet, magnetic positioning means for positioning said permanent magnet at a nominal position with respect to said magnetic core when said acceleration force is substantially zero, and comprising magnetic control means coupled to control the position of said permanent magnet with respect to said magnetic core so that the operability of said accelerometer may be verified.

8. An accelerometer comprising at least one magnetic core whose magnetic characteristics change upon the application of pressure to said core, a drive line coupled to said core for supplying electrical signals, a sense line coupled to said core for receiving said electrical signals, a magnetizable member movable with respect to said core in response to an acceleration force acting on said magnetizable member so as to impart pressure upon said magnetic core in order to control the magnetic characteristics of said core in response to the acceleration of said magnetizable member and magnetizing means coupled to said magnetizable member so as to magnetize said member in a manner that controls the position of said magnetizable member with respect to said magnetic core so that the operability of said accelerometer may be verified.

9. An accelerometer comprising at least one saturable magnetic core, a drive line coupled to said core for supplying electrical signals, a sense line coupled to said core for receiving said electrical signals from said drive line when said core is not saturated, a magnetically-effected member movable with respect to said core in response to an acceleration force which acts upon said magnetically-effected member so as to control the saturation of said core in response to the acceleration of said magnetically-effected member, magnetic positioning means for positioning said magnetically-effected member at a nominal position with respect to said magnetic core when said acceleration force is substantially zero, and comprising magnetic control means coupled to control the position of said magnetically-effected member with respect to said magnetic core so that the operability of said accelerometer may be verified.

* * * * *